Figure 1:
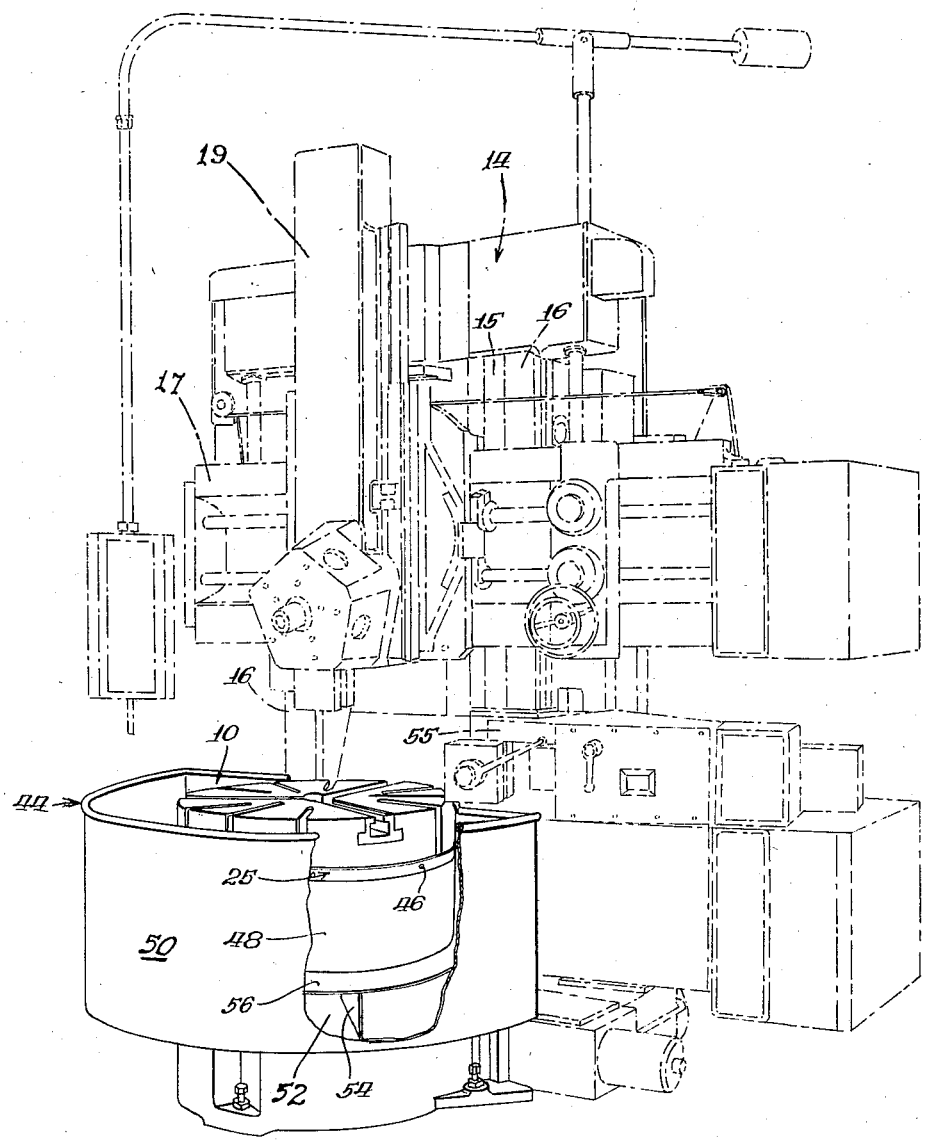

June 9, 1959     H. E. LAUBACH     2,889,722
COOLANT DRAIN AND SEALER ARRANGEMENT
Filed Nov. 21, 1955     3 Sheets-Sheet 1

INVENTOR.
Howard E. Laubach

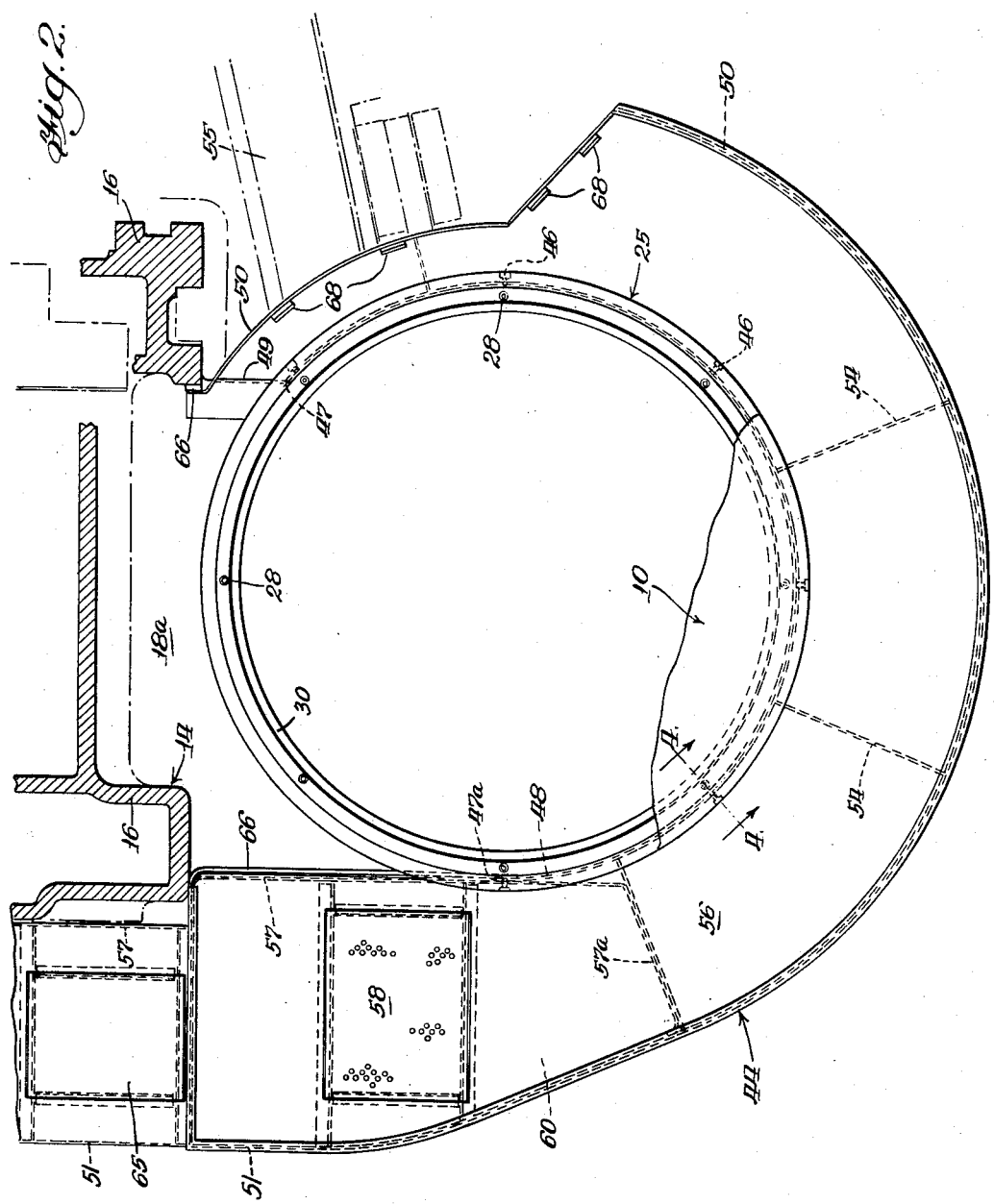

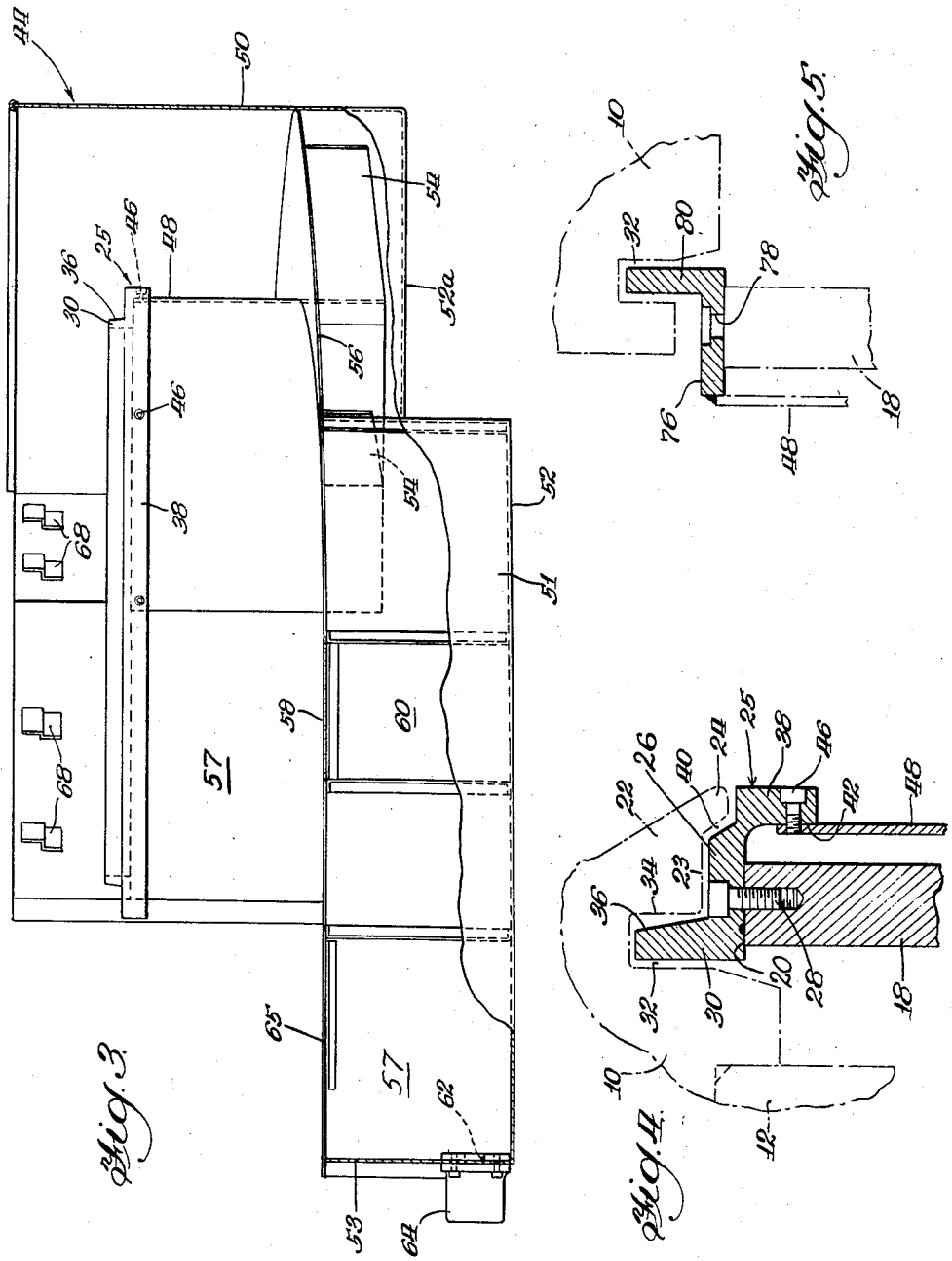

United States Patent Office 2,889,722
Patented June 9, 1959

2,889,722
COOLANT DRAIN AND SEALER ARRANGEMENT

Howard E. Laubach, Cincinnati, Ohio, assignor to American Steel Foundries, Chicago, Ill., a corporation of New Jersey Application November 21, 1955, Serial No. 548,087

10 Claims. (Cl. 77—4)

This invention relates to table sealing means and coolant drain pans for vertical turret lathes or boring mills.

In the type of machining for which it is contemplated that this invention will be used, a work piece is mounted on a table rotatable on a vertical axis. The cutting tool is moved either radially or axially of the work piece in a conventional manner. In performing cutting operations, it is sometimes necessary to use a fluid coolant to prevent overheating and consequent damage to both the cutting tool and to the work piece. When using coolant, it is necessary to provide a coolant drain pan and it is also necessary to provide an effective seal around the table to keep the coolant away from the table spindle bearings so that the bearing lubricant will not wash away. It has been customary to machine a spindle sealing portion integral with an extension of the bed of the machine and then to set the entire machine into a drain pan. This of course was an extremely costly procedure. Furthermore, accessibility was poor, the drain pans were hard to clean and the problems involved in aligning the machine were acute. In some instances, separable drain pans have been provided, but difficulty arose in matching the drain pans to the rough bed casting, and it was very difficult to seal the spindle bearings from the coolant fluid.

One of the objects of the present invention is to provide a sealing ring which is separable from the machine bed and which can be accurately machined.

Another object of the invention is to provide a sealing ring having a machined surface to which a coolant drain pan may be directly attached.

Still another object of the invention is to provide a drain pan supported from a separable sealing ring, the pan being low in cost, efficient in operation and also affording great accessibility for cleaning and the like.

Other objects and advantage will become apparent from an examination of the following specification and accompanying drawings, in which:

Figure 1 is a general perspective view of a boring mill incorporating the present invention, Figure 2 is a top plan view of the sealing ring and drain pan as applied around the table of a vertical boring mill, Figure 3 is a side elevational view of the drain pan and sealing ring, with portions of the pan broken away, Figure 4 is a section taken at the line 4—4 of Figure 2, and illustrating one form of the sealing ring, and Figure 5 is a view similar to Figure 4 showing another form of sealing ring.

In the various views, the boring mill has been shown only fragmentarily since this type of machine is well understood by those familiar with this art, and only the table area is concerned with the invention herein to be disclosed.

Referring to the drawings, a rotatable table 10 is carried on a bearing supported power driven spindle 12 (Figure 4) for rotation therewith. The spindle is driven by suitable motor means (not shown). The body of the boring mill indicated generally at 14 has been only fragmentarily shown in Figure 2 and comprises a pair of vertical columns 16 provided with vertically disposed ways 15 adapted to carry a rail 17 movable upwardly or downwardly relative to the table 10. Supported on the rail is a ram 19 which is adapted to move a tool radially toward and away from the axis of rotation of a work piece (not shown) mounted on and rotatable with the table 10. The body 14 comprises also a forwardly extending portion 18a having a generally cylindrical housing portion 18 adapted to carry the power driven spindle 12 and its bearings, and to substantially enclose same.

Referring to Figure 4, it may be seen that the cylindrical portion 18 extends upwardly to a point which is below the table 10 and terminates with a flat substantially horizontal top surface 20. The periphery 22 of the table 10 is slightly larger in diameter than the portion 18 and has a lower surface 23 spaced from surface 20 and also has a downwardly projecting portion 24 extending substantially to the plane of the top surface 20. Interposed between the surfaces 20 and 23 is a sealing ring indicated generally at 25 having a horizontally disposed portion 26 which rests on surface 20 and is removably secured to the portion 18, as by means of cap screws 28. The sealing ring 25 comprises an upwardly tapered annular leg 30 at the radially inner periphery of the ring extending upwardly from the portion 26 to be received within an annular recess 32 formed in the table 10 to form therewith a labyrinth type seal. Inasmuch as the table must rotate relative to the ring 25, the table and ring may not be in contact with each other and clearance must be provided between them. The outer surface 36 of the leg 30 may be disposed angularly relative to the surface 34 of the table for the purpose of preventing coolant from climbing over the top of the leg 30. This angularity is, of course, old in the art and forms no part of the present invention. It should be noted here that in the prior art, a portion corresponding to leg 30 was machined integrally with the bed portion 18 to project into an annular recess in the table to provide thereby a seal. It can be readily appreciated that machining a contour such as this accurately was extremely difficult. Utilizing a separable ring such as disclosed in the present invention, it is a comparatively easy matter to accurately machine the ring to the desired dimensions.

The outer periphery of the sealing ring 25 may be formed into a downwardly extending annular leg 38, care being taken to provide clearance as at 40 between the table and the ring. The inner surface 42 of the leg 38 is machined to provide a surface to which can be attached a drain pan indicated generally at 44 which is secured to the ring in any desired manner. For the purpose of illustration, the pan has been shown secured to the sealing ring by means of a plurality of cap screws 46.

The drain pan 44 comprises a substantially vertical inner wall 48 extending around the portion 18 from point 47 to point 47a (Figure 2). An end wall 49 angles off from wall 48 to join an outer wall 50 extending concentrically of the table 10 between the table and the side head 55 of the boring mill and extending therefrom around the front of the table. The outer wall 50 has at one side thereof a continuous downwardly extending portion 51 (Figure 3) defining the external wall of a sump 60. The portion 51 extends toward the body of the mill to join an end wall 53 connecting portion 51 with the body 14. An inner sump wall 57 (Figure 2) extends from end wall 53, along portion 18a and portion 18, and thence extends outwardly of the table as at 57a to the wall portion 51, thereby completing the sump wall enclosure. A bottom wall 52 (Figure 3) for the sump and a bottom wall 52a for the remainder of the drain pan are provided. Spaced vertical webs 54 are utilized to lend strength to the inner and outer walls and also to support the sloping drain plate 56 which is provided with a reversible perforated drain plate 58 pressed into a complementary opening of plate 56 and interconnecting the drain portion of the pan with the sump portion 60. The end wall 53 of sump 60 is provided with an opening 62 affording communication with a conventional circulating pump 64 which is bolted to plate 53 and serves to continuously circulate the coolant while the boring mill is operating. A cleanout door affording access to the sump is shown at 65.

As best seen in Figure 2, the drain pan substantially surrounds the front and sides of the table and therefrom extends toward the body of the boring mill and is sealed at the juncture therewith as at 66 with sealing compound.

It may also be desirable to provide clips 68 into which an auxiliary splash pan (not shown) may be mounted for the purpose of protecting the side head 55 from being splashed with coolant.

The drain pan may be easily mounted on a boring mill by first removing the table 10. The drain pan, which has been previously fastened to the sealing ring 25, is then lowered into position with the sealing ring resting on portion 18 of the mill. The ring is then screwed to portion 18 and the sealing compound 66 is applied at the juncture of the pan with the mill body 14. The pump 64 is then bolted into position and the table 10 is lowered onto spindle 12. Disassembly may be easily accomplished by reversing the above procedure.

Whereas the sealing ring described above is preferably cast and subsequently machined to its final dimensions, an alternate form of sealing ring may be provided which is made of rolled steel and which requires very little, if any, machining. This alternate form of sealing ring is indicated generally in Figure 5, and comprises a generally horizontal annular leg 76 having openings 78 therethrough adapted to receive cap screws by which the ring may be secured to portion 18 of the mill. The ring also comprises a vertical annular leg 80 adapted to be received in the annular recess 32 of the table 10. Figure 5 shows the drain pan welded to the sealing ring and it will be understood that either the bolted or welded construction, as desired, may be used with either of the disclosed types of sealing ring.

It will be apparent from the above description of the invention that an effective sealing ring and drain pan has been provided which are far less expensive to fabricate and maintain than conventional drain pans and sealing systems heretofore used. Not only is much better sealing possible of attainment because the separable sealing ring may be accurately machined, but also the problem of accurately fitting a drain pan to the supporting surface has been eliminated. The reason for this is that the sealing ring may be sent out to wherever the drain pans are being made and the drain pans accurately machined to fit the supporting surface. Utilizing this method, it is obvious that a much better fit can be obtained than was obtainable when the drain pan was mounted on the rough bed casting.

I claim:

1. In a vertical boring mill, the combination of a vertical column, a portion of said column extending forwardly thereof, said portion having a generally cylindrically contour and a centrally disposed spindle cavity, a power driven spindle received within said cavity, a table supported on said spindle and rotatable therewith on a substantially vertical axis, said table having a diameter larger than said portion, said table having an annular recess in the bottom surface thereof, said recess being substantially aligned with the wall of said portion, a sealing ring, said ring having a substantially horizontal leg arranged to be detachably secured to said portion, said ring having a substantially vertical leg received within said table recess in spaced relationship with said table whereby coolant fluid is excluded from said spindle cavity, and a coolant drain pan secured to said ring, said ring and pan being removable as a unit after removal of said table.

2. In a vertical boring mill comprising a spindle supported table rotatable about a substantially vertical axis; a housing portion extending forwardly of said mill to substantially surround said spindle, an annular sealing ring removably secured to said portion, an annular leg extending upwardly of said ring to form with the table a labyrinth type seal, the outer periphery of said ring comprising a depending leg, a drain pan substantially surrounding said portion and table, said pan comprising an inner wall adapted for attachment to said depending leg, said pan and ring being adapted for removal as a unit in an upward direction after removal of said table.

3. In a vertical boring mill, the combination of a power-driven spindle, a table carried by said spindle, said table having an annular recess in the bottom surface thereof, a generally cylindrical housing surrounding said spindle and disposed beneath the outer periphery of said table, a sealing ring detachably secured to said housing, said ring having a tapered annular leg received within said recess in spaced relationship with said table for preventing coolant fluid from entering said housing, a drain pan detachably secured to said ring and substantially surrounding said table and housing, said sealing ring and drain pan being removable as a unit after removal of said table.

4. In a vertical boring mill, the combination of a power-driven spindle, a table carried by said spindle for rotation therewith, said table having an annular recess in the bottom surface thereof, a housing surrounding said spindle and disposed beneath the outer periphery of said table, a sealing ring detachably secured to said housing, said ring having an inner upwardly extending leg received within said recess in spaced relationship with said table, said ring having an outer downwardly projecting leg disposed beneath the peripheral portion of said table, and a drain pan detachably secured solely to said outer leg and substantially surrounding said housing and table.

5. In a vertical boring mill, the combination of a power-driven spindle, a table carried by said spindle for rotation therewith, said table having an annular recess in the bottom surface thereof, a housing surrounding said spindle and disposed beneath the outer periphery of said table, a sealing ring detachably secured to said housing, said ring having an inner upwardly extending leg received within said recess in spaced relationship with said table, said ring having an outer downwardly projecting leg disposed beneath the peripheral portion of said table, and a drain pan secured to said outer leg and substantially surrounding said housing and table, said sealing ring and drain pan being removable as a unit in an upward direction.

6. A drain pan and sealing ring arrangement for a vertical boring mill having a spindle rotatable about a substantially vertical axis, a cylindrical spindle housing portion substantially surrounding said spindle, a table carried by said spindle for rotation therewith, the diameter of said table being larger than said housing portion, said table having an annular recess in the bottom thereof; said arrangement comprising a sealing ring detachably mounted on said housing portion, the outer diameter of said ring being approximately equal to the diameter of said table, said ring having an inner vertically extending leg received within said recess in spaced relationship with said table to form therewith a labyrinth type seal; and a drain pan detachably carried solely by said ring for receiving coolant fluid from said table, said sealing ring and drain pan being removable as a unit from said housing portion.

7. In a vertical boring mill, a spindle, a table detachably mounted thereon, a housing with a substantially cylindrical portion encircling the spindle, a ring detachably mounted on the top of the portion, an upstanding projection on the ring entirely disposed radially inwardly of the outer perimeter of the table and received within a recess in the bottom thereof, a downwardly extending leg on the ring encircling the outer perimeter of the portion, a drain pan having an inner parti-cylindrical wall detachably mounted to the inner perimeter of the leg radially inwardly of the outer perimeter of the table, spaced walls extending from opposite ends of the parti-cylindrical wall, an outer wall, a bottom wall interconnecting the inner and outer walls, said inner and outer walls having extensions extending downwardly below the level of the bottom wall, a sloping drain plate extending between the inner and outer walls above the bottom wall, another bottom wall connected to the lower ends of said extensions to define the bottom of a sump, said drain plate having a perforated portion defining the top of the sump, and a wall connecting said bottom walls to corresponding ends of the extensions and to said plate to define an end of the sump.

8. In a vertical boring mill, a spindle, a table detachably mounted thereon, a housing with a substantially cylindrical portion encircling the spindle, a ring detachably mounted on the top of the portion, an upstanding projection on the ring entirely disposed radially inwardly of the outer perimeter of the table and received within a recess in the bottom thereof, a downwardly extending leg on the ring encircling the outer perimeter of the portion, a drain pan having an inner parti-cylindrical wall detachably mounted to said leg, spaced walls extending between opposite ends of said parti-cylindrical wall and the mill, an outer wall, a bottom wall interconnecting the inner and outer walls, said inner and outer walls having extensions extending downwardly below the level of the bottom wall, a sloping drain plate extending between the inner and outer walls above the bottom wall, another bottom wall connected to the lower ends of said extensions to define the bottom of a sump, said drain plate having a perforated portion defining the top of the sump, a wall connecting said bottom walls to corresponding ends of the extensions and to said plate to define an end of the sump, and a trap door in said drain pan affording access to the sump.

9. In a vertical boring mill, a spindle, a table detachably mounted thereon and having an annular recess in the bottom thereof, a housing with a substantially cylindrical portion encircling the spindle, a ring detachably mounted on the top of said portion, an upstanding projection on the ring received within said recess, a depending leg on the ring encircling the portion, a drain pan having an inner parti-cylindrical wall detachably secured to the leg, spaced walls extending from opposite ends of the parti-cylindrical wall to the mill, an outer wall, a bottom wall interconnecting the inner and outer walls, said inner and outer walls having extensions below the level of the bottom wall, a drain plate extending between the inner and outer walls above the bottom wall, another bottom wall connected to the lower ends of said extensions to define the bottom of a sump, said drain plate having a perforated portion affording communication with the sump, a wall connecting the bottom walls and drain plate to corresponding ends of the extensions to define an end of the sump, a trap door in said drain pan affording access to the sump, and a recirculating pump communicating with the sump.

10. In a vertical boring mill, a spindle, a table detachably mounted thereon and having an annular recess in the bottom thereof, a housing with a substantially cylindrical portion encircling the spindle, a ring detachably mounted on the top of said portion, an upstanding projection on the ring received within said recess, a depending leg on the ring encircling said portion, a drain pan having an inner parti-cylindrical wall detachably secured to the leg, spaced walls extending from opposite ends of the parti-cylindrical wall to the mill, an outer wall, a sloping drain plate extending between the inner and outer walls, said inner and outer walls having extensions below the level of the drain plate, a bottom wall connected to the lower ends of said extensions to define the bottom of a sump, said drain plate having a perforated portion defining the top of the sump, a wall connecting the bottom wall and drain plate to corresponding ends of the extensions to define an end of the sump, and a recirculating pump communicating with the sump.

References Cited in the file of this patent

UNITED STATES PATENTS

| | | |
|---|---|---|
| 1,076,947 | Bullard | Oct. 28, 1913 |
| 2,086,847 | Bullard | July 13, 1937 |